Sept. 13, 1960
E. M. KNIGHTS, JR
2,952,386
ULTRAMICRO BURET
Filed Oct. 7, 1957
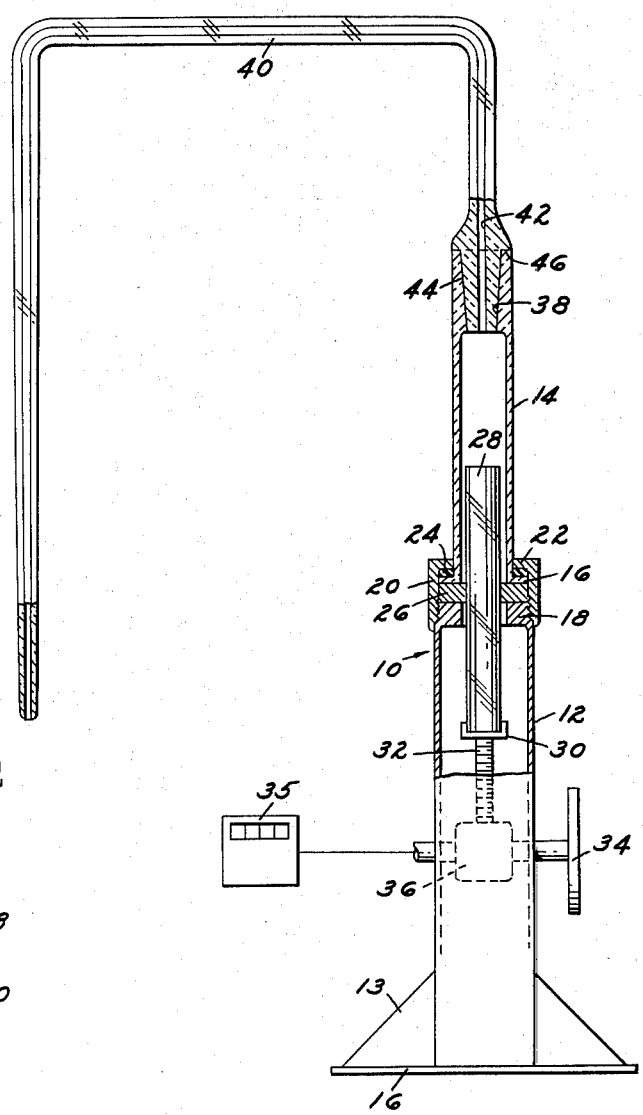
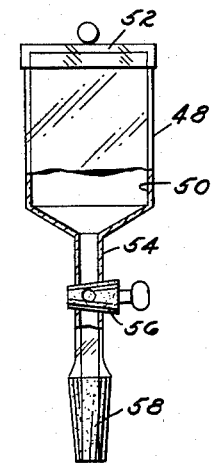
INVENTOR.
EDWIN M. KNIGHTS JR.
BY
Whittemore, Hulbert & Belknap
ATTORNEYS

United States Patent Office 2,952,386
Patented Sept. 13, 1960

2,952,386

ULTRAMICRO BURET

Edwin M. Knights, Jr., Grosse Pointe, Mich.
(4101 Greenbrook Lane, Flint 7, Mich.)

Filed Oct. 7, 1957, Ser. No. 688,727

1 Claim. (Cl. 222—38)

This invention relates to an ultramicro buret for use in titration procedures.

Effective titration requires that the apparatus employed be capable of displacing very exact measured quantities of liquid or reagent, and such apparatus usually includes a cylinder and a displacement plunger therein of uniform size and caliber. In order to insure that exact measured quantities are displaced, it is essential that the cylinder be virtually devoid of air.

One object of this invention is to provide improved titration apparatus fulfilling the foregoing requirements.

Another object of the invention is to provide an ultramicro buret having a vertical cylinder mounted on a base with a displacement plunger reciprocable therein, the cylinder being provided with a joint at the upper end for connection either with a buret tip or a refilling chamber and formed with a combined discharge and refilling opening.

Other objects and features of the invention will become apparent as the description proceeds, especially when taken in conjunction with the accompanying drawing illustrating a preferred embodiment of the invention, wherein:

Fig. 1 is a diagrammatic side elevational view, partly in section, of an ultramicro buret embodying the invention.

Fig. 2 is an elevational view, partly in section, of a refilling chamber which may be employed for refilling the buret showin in Fig. 1.

Referring now more particularly to the drawing, the buret is generally indicated at 10 and comprises a tubular base 12 having an enlarged circular lower end 13 which is adapted to rest upon a supporting surface 16 and to support the base in the vertical position illustrated in Fig. 1. A vertical open ended cylinder 14 is secured to and extends upwardly from the top of the base. The lower end of the cylinder 14, which may be of glass for example, is formed with a laterally outwardly extending annular flange 16 and the upper open end of the base 12 is formed with a laterally inwardly extending annular flange 18. The cylinder 14 is removably secured to the base by a collar 20. The lower end of the collar is internally threaded and is secured onto the upper end of the base. The upper end of the collar is formed with a laterally inwardly extending annular flange 22, and an annular washer 24 of rubber or like material encircles the cylinder 14 between the flanges 16 and 22. An annular gasket 26 of a suitable material such as Teflon is compressed between the flanges 16 and 18 of the cylinder and base respectively when the collar is tightened down.

A vertical plunger 28 is reciprocable within the cylinder. The plunger is of uniform circular cross-section throughout its length and has a tight sliding fit within the gasket 26 so as to prevent the escape of reagent from the cylinder during the reciprocation of the plunger.

The lower end of the plunger extends into the tubular base and is supported by a cup-shaped member 30. The member 30 is swiveled to the upper end of a vertical screw 32 so that rotation of the screw will not be imparted to the plunger and the plunger may therefore be reciprocated by the screw without rotation. The screw is rotated by a handle 34 through a gear box 36 supported within the base. Rotation of the handle 34 results in a rotation of the screw 32 and simultaneous axial movement of the screw in one direction or the other depending upon the direction of rotation of handle 34. A counter 35 is associated with the gear box 36 so that the movement of the screw 32 in terms of displacement of reagent in the cylinder 14 by the plunger may be recorded.

The upper end of cylinder 14 is open and is formed by a frusto-conical internal surface 38 which provides a joint and a combined discharge and filling opening. The cylinder 14 is of uniform circular cross-section from its lower end to the frusto-conical surface 38. The axis of the frusto-conical opening is coincident with the axis of the cylinder 14 and therefore vertical.

A buret tip 40 is provided having an axial passage 42 extending from one end thereof to the other. The buret is formed at one end with a frusto-conical external surface 44 complementary with the surface 38 to have a close mating fit therewith as illustrated. Above the frusto-conical surface 44 the tip 40 is enlarged to provide a shoulder 46 adapted to rest upon the upper end of the cylinder in the assembled relation of the cylinder and tip.

Fig. 2 illustrates a refilling member 48. The member 48 is in the form of a liquid container having a chamber 50 therein open at the top and normally closed by a removable cover 52. A tube 54 extends from the lower end of the chamber 50 in communication therewith, the passage in the tube being open entirely to the lower end thereof and adapted to be opened and closed by the petcock 56. The lower end of the tube 54 is formed with a frusto-conical external surface 58 complementary with the internal surface 38 of the cylinder to have a mating fit therewith.

In order to fill the cylinder 14, the buret tip is removed and the member 48 is assembled with the cylinder with the frusto-conical end of the tube 54 inserted into the upper end of the cylinder. The cock 56 is then opened to permit reagent in the chamber 50 to fill the cylinder 14. The plunger 28 may be moved downwardly by suitable operation of the handle 34 to facilitate the filling of the chamber 14. At the end of the filling operation, any air in the cylinder will naturally rise to the top toward the filling opening due to the fact that the cylinder is disposed vertically and has its filling opening at the upper end. The cock 56 is closed and the refill member removed, whereupon the buret tip may again be assembled with the cylinder in the relationship shown in Fig. 1. Any small amount of air that may exist at the upper end of the cylinder may be initially displaced by upward movement of the plunger 28. After all air has been removed from the cylinder, the counter 35 may be set to zero and the ultramicro buret is ready to begin the titration procedure.

What I claim as my invention is:

An ultramicro buret adapted for titration procedures comprising a vertically extending tubular base, a supporting member secured to said base at the lower end thereof, a laterally and inwardly extending annular flange integral with the upper end of said base, a gear box within said tubular base, a rotatable shaft extending transversely through said tubular base and gear box, means on one end of said shaft for imparting rotary motion thereto, an indicator on the other end of said shaft, a screw extending vertically from said gear box operable to move vertically on rotation of said shaft, a cup swivelled to the upper end of said screw, a vertical plunger, the bottom of which is positioned within said cup extending out of said tubular base through said other end thereof, a gasket tightly surrounding said plunger and resting on the upper surface of said flange, a hollow vertically extending cylinder having a radially and outwardly extending flange sleeved over the upper end of said plunger with said flange resting on said gasket, an annular washer encircling said cylinder and in contact with the upper surface of the cylinder flange, a collar having a radially and inwardly extending flange on the upper end thereof adapted to sleeve over said cylinder and threadedly engaged with said upper end of said base, the collar flange contacting the upper surface of said washer whereby said collar secures said base, gasket, cylinder and washer in assembly, and a buret tip removably positioned in the upper end of said cylinder whereby on rotation of said shaft said plunger moves vertically in said cylinder to displace fluid therefrom through said buret tip and the amount of fluid displaced is registered on said indicator.

References Cited in the file of this patent

UNITED STATES PATENTS

| 111,669 | Munson | Feb. 7, 1871 |
| 328,346 | Severance | Oct. 13, 1885 |
| 2,218,899 | Warren | Oct. 22, 1940 |
| 2,622,765 | Gilmont | Dec. 23, 1952 |
| 2,699,889 | Johnson | Jan. 18, 1955 |

FOREIGN PATENTS

| 906,771 | France | May 28, 1945 |
| K18,181 | Germany | Mar. 16, 1956 |